UNITED STATES PATENT OFFICE.

FRANCIS C. FRARY, OF OAKMONT, PENNSYLVANIA, ASSIGNOR TO ALUMINUM COMPANY OF AMERICA, A CORPORATION OF PENNSYLVANIA.

METHOD OF MANUFACTURING ALUMINUM CHLORID.

1,354,818.     Specification of Letters Patent.     Patented Oct. 5, 1920.

No Drawing.     Application filed May 26, 1920. Serial No. 384,443.

*To all whom it may concern:*

Be it known that I, FRANCIS C. FRARY, a resident of Oakmont, in the county of Allegheny and State of Pennsylvania, have invented a new and useful Improvement in Methods of Manufacturing Aluminum Chlorid, of which the following is a specification.

In the manufacture of anhydrous aluminum chlorid by the process of reducing bauxite or other forms of alumina in the presence of chlorin, it is necessary to supply heat to the mass to cause the reaction to proceed properly. This is due to the fact that the reaction involved is but slightly exothermic, the amount of heat produced being quite insufficient to maintain the elevated temperature required for the proper progress of the reaction and to compensate for the heat carried off by the aluminum chlorid vapors.

For the purpose of supplying the necessary heat, the retorts have, in some instances, been heated externally. However, this introduces difficulties, among which is the attack by the mixture of carbon or other reducing agents and chlorin on practically all materials of retort construction, and also the difficulty of keeping a retort gas-tight at the furnace temperature required for the reaction. To overcome the difficulties involved in heating the retort externally, it has been proposed to produce the necessary reaction temperature by preheating the chlorin, by preheating the mixture through partial combustion of its carbon content, and by various other ways, all involving an extra step in the operation, or objectionable for some other reason.

The present invention relates to the production of aluminum chlorid by the general process just explained, and the object thereof is to improve the process to the end that the heat necessary to effect the reaction may be economically generated within the body of materials in a simple, effective and practical manner.

In the practice of the invention alumina is reduced by carbon or similar material in the presence of chlorin and aluminum, the heat required for properly maintaining the reduction of the alumina being derived from the highly exothermic reaction between the aluminum and a portion of the chlorin.

Various forms of alumina may be used, as for example bauxite. When bauxite is used, the proper amount of aluminum to produce the required heat is, in a finely divided state, added to the alumina; sufficient chlorin being used to react with the aluminum and with the reduced alumina. However, because of the economics involved, it is preferred to use aluminum dross materials which consist largely of alumina mixed with from about 15% to 50% of finely divided aluminum. When the proportion of aluminum to alumina in the dross is sufficiently large, aluminum chlorid may be produced directly from the dross by the addition of chlorin and sufficient reducing material such as carbon in the form of coke dust, charcoal, etc. An economical advantage in the use of aluminum dross is that the aluminum in such dross is not very valuable because it cannot be cheaply and effectively recovered.

As a specific example of the practice of the process with the use of aluminum dross, the mixture of materials may be in the proportion of 100 pounds of finely divided dross containing 40% of aluminum mixed with 25 pounds of coke, into which there is gradually passed about 280 pounds of chlorin. It has been found that with such a mixture the aluminum begins to react with the chlorin at about 50° C., thereby evolving sufficient heat to raise the temperature of the body or mixture of materials to that required for effecting the reaction between the chlorin, coke and alumina. With dross containing too little aluminum, compensation may be made for the deficiency thereof by the addition of finely divided aluminum, as for example, turnings and borings. On the other hand, if the amount of aluminum in the dross is more than sufficient to provide the heat required, it is manifest that calcined bauxite or other forms of alumina, mixed with the proper proportion of carbon or other reducing agent, may be added to and mixed with the dross to produce the maximum yield of aluminum chlorid. In particular, when the process is being operated more or less continuously and the materials are charged into a hot retort, the proportion of metallic aluminum may be largely decreased.

The process may be conducted in variously constructed retorts. The retort may, however, be advantageously constructed of a body of cast iron provided with a lining constructed of a mixture of suitable proportions of coke dust and pitch or tar. In forming the lining, such mixture may be rammed into place on the inner wall of the retort body between such wall and a form placed within the retort. The lining may be finally baked in place in the well known manner, and the exterior of the retort may be covered with a suitable heat insulation, such as asbestos.

I claim:—

1. The method of manufacturing aluminum chlorid, which consists in reducing alumina in the presence of chlorin and aluminum.

2. The method of manufacturing aluminum chlorid, which consists in causing chlorin and a reducing agent to react with alumina at a temperature maintained in the mass by the addition thereto of aluminum.

3. The method of manufacturing aluminum chlorid, which consists in causing chlorin and carbon to react with alumina at an elevated temperature maintained exothermically in the mass by the addition of aluminum thereto.

4. The method of manufacturing aluminum chlorid, which consists in reducing alumina in the presence of chlorin and aluminum, the aluminum combining with a portion of the chlorin whereby the temperature necessary for the reduction is maintained.

5. The method of manufacturing aluminum chlorid, which consists in adding chlorin and a reducing agent to a pulverulent body of aluminum dross.

In testimony whereof I have hereunto set my hand.

FRANCIS C. FRARY.

Witnesses:
LOUISA I. MCANALLEN,
D. L. ALTER.